(12) United States Patent
Karam et al.

(10) Patent No.: US 11,698,326 B2
(45) Date of Patent: Jul. 11, 2023

(54) NONDESTRUCTIVE IMAGING AND SURFACE QUALITY INSPECTION OF STRUCTURED PLATES

(71) Applicant: CORNING INCORPORATED, Corning, NY (US)

(72) Inventors: Raymond Miller Karam, Santa Barbara, CA (US); Eric Louis Null, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 181 days.

(21) Appl. No.: 16/943,721

(22) Filed: Jul. 30, 2020

(65) Prior Publication Data
US 2021/0048368 A1  Feb. 18, 2021

Related U.S. Application Data

(60) Provisional application No. 62/888,128, filed on Aug. 16, 2019.

(51) Int. Cl.
*G01M 11/08* (2006.01)
*G02B 21/04* (2006.01)
*G02B 21/26* (2006.01)

(52) U.S. Cl.
CPC .......... *G01M 11/081* (2013.01); *G02B 21/04* (2013.01); *G02B 21/26* (2013.01)

(58) Field of Classification Search
CPC .... G02B 21/04; G02B 21/26; G02B 21/0016; G01B 11/24; G01B 11/303; G01B 11/12;
(Continued)

(56) References Cited

U.S. PATENT DOCUMENTS 5,515,960 A * 5/1996 Wood ............... G07F 1/044
194/344
6,879,051 B1 * 4/2005 Singh ............... C23C 16/045
257/762
(Continued)

FOREIGN PATENT DOCUMENTS

WO 2012/174311 A2 12/2012

OTHER PUBLICATIONS

Zygo Corporation, "Using Coherence Scanning Interferometry to Measure High-Slope Parts", Available Online at <https://www.azom.com/article.aspx?ArticleID=13792>, Apr. 10, 2017, 12 pages.

*Primary Examiner* — Sang H Nguyen

(57) ABSTRACT

A system includes a stage, a detector and a measuring device. The stage is configured to hold a substrate. The substrate includes a plurality of tapered structures, and each of the plurality of tapered structures includes a tapered wall between first and second openings at opposite ends of the plurality of tapered structures. The detector is tilted at a first angle and configured to measure light reflected from the tapered wall at about 90 degrees to the tapered wall. The first angle depends at least in part a second angle between the tapered wall and a longitudinal axis running through the tapered structure. The measuring device is configured to determine a characteristic of the tapered wall and whether the characteristic of the tapered wall is above or below a threshold.

14 Claims, 8 Drawing Sheets

(58) Field of Classification Search
CPC .. G01B 5/0004; G01N 21/954; G01N 21/958; G01N 2021/9583; G01M 11/081
See application file for complete search history.

(56) References Cited

U.S. PATENT DOCUMENTS

| | | | |
|---|---|---|---|
| 7,655,475 B2* | 2/2010 | MacCraith | G01N 21/6452 356/135 |
| 2005/0282300 A1* | 12/2005 | Yun | G01N 23/2252 700/121 |
| 2008/0149948 A1* | 6/2008 | Mayers | H01L 33/24 257/89 |
| 2010/0284027 A1* | 11/2010 | Scheiner | G01B 11/08 356/626 |
| 2013/0207212 A1* | 8/2013 | Mao | H01L 27/1462 257/432 |
| 2015/0108353 A1* | 4/2015 | Geiger | G01D 5/34707 250/341.8 |
| 2016/0334326 A1* | 11/2016 | Sapiens | G01B 11/24 |
| 2018/0138330 A1* | 5/2018 | Choi | H01L 51/44 |
| 2018/0182600 A1* | 6/2018 | Sohn | H01L 21/67069 |
| 2018/0332665 A1* | 11/2018 | Gaab | H05B 3/66 |

* cited by examiner

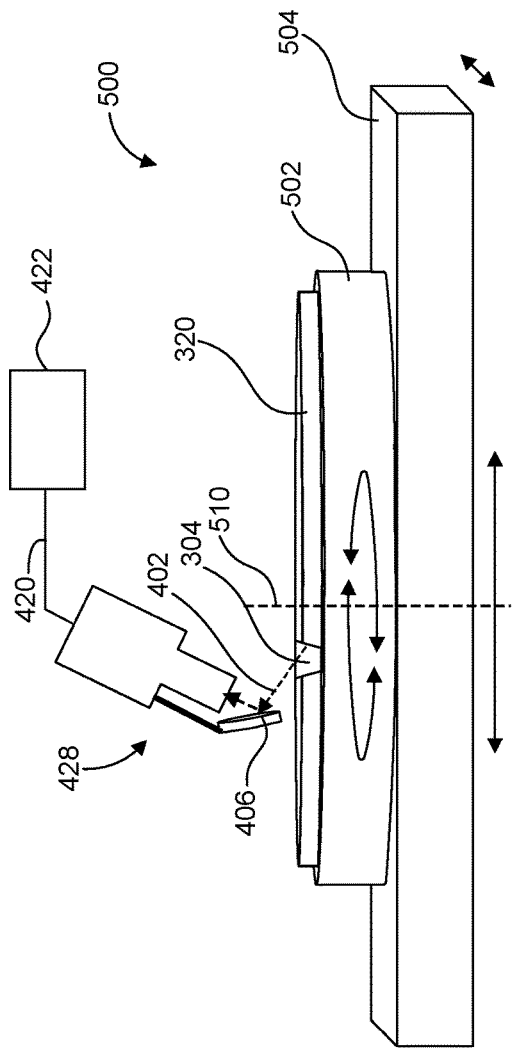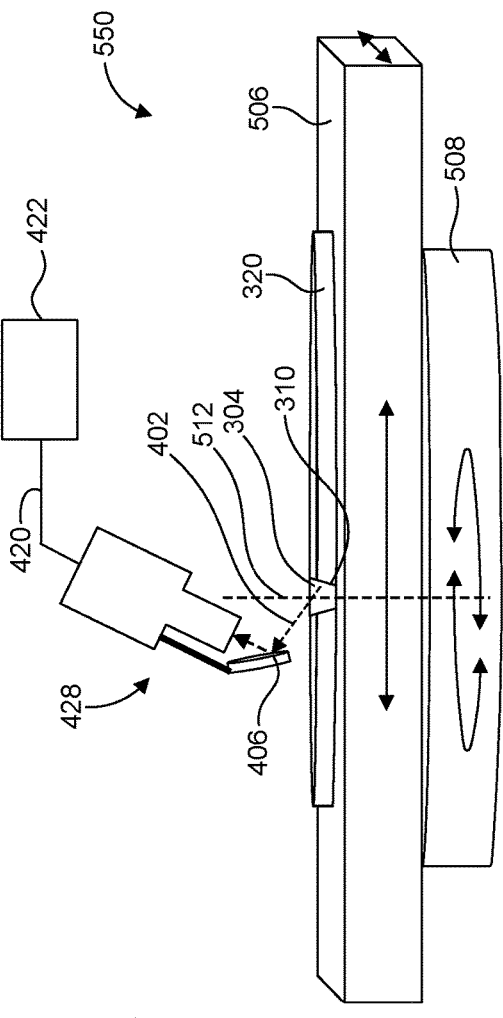

NONDESTRUCTIVE IMAGING AND SURFACE QUALITY INSPECTION OF STRUCTURED PLATES

CROSS-REFERENCE TO RELATED APPLICATIONS

This application claims the benefit of priority under 35 U.S.C. § 119 of U.S. Provisional Application No. 62/888,128 filed Aug. 16, 2019, the content of which is incorporated herein by reference in its entirety.

BACKGROUND

Field

The present disclosure relates to nondestructive imaging and surface quality inspection systems, methods, and apparatuses, for example, nondestructive inspection systems, methods, and apparatuses for surface quality of bores on glass plates of transmissive liquid lenses.

Technical Background

Liquid lenses generally include two immiscible liquids disposed within a cavity. Varying an electric field to which the liquids are subjected can vary the wettability of one of the liquids with respect to the cavity wall, thereby varying the shape of the meniscus formed between the two liquids. The cavity can be defined by a bore in a plate of liquid lenses and surface quality of the tapered wall of the bore can affect liquid lenses performance. The tapered wall surface quality can change with the lifetime of the mold producing the bore, as well as the position of the bore on a substrate during manufacturing. Accordingly, measuring and monitoring of the tapered wall surface quality are of high importance for quality control of bores and liquid lenses manufacturing processes.

SUMMARY

In some embodiments, a system includes a stage, a detector, and a measuring device. The stage can be configured to hold a substrate. The substrate can include a plurality of tapered structures, and each of the plurality of tapered structures can include a tapered wall between first and second openings at opposite ends of the plurality of tapered structures. The detector can be tilted at a first angle and configured to measure light reflected from the tapered wall at about 90 degrees to the tapered wall. The first angle can be set based on a second angle between the tapered wall and a longitudinal axis running through the tapered structure. The measuring device can be configured to determine a characteristic of the tapered wall and whether the characteristic of the tapered wall is above or below a threshold.

In some embodiments, the first angle can be up to about 60 degrees between the detector and the longitudinal axis. In some embodiments, the second angle can be about 30 degrees between the tapered wall and the longitudinal axis.

In some embodiments, the detector can further include a fold mirror, and the fold mirror and the detector have a third angle about 45 degrees, such that the fold mirror directs the reflected light to the detector. In some embodiments, the first angle can be up to 45 degrees between the detector with a fold mirror and the longitudinal axis.

In some embodiments, the detector can have a working distance larger than about 10 mm. In some embodiments, area parameters or line parameters may be extracted from the measurement. In some embodiments, the determined characteristic of the tapered wall can include surface roughness, linearity, shape, and defects. In some embodiments, the characteristic can include features having a height of nanometer scale over a micrometer measurement range. In some embodiments, the substrate can include glass.

In some embodiments, the first and second openings can have diameters ranging from about 1.5 mm to about 2.5 mm. In some embodiments, each of the tapered structures can have a height ranging from about 0.3 mm to about 1 mm.

In some embodiments, the stage includes a rotation stage and a translation stage. In some embodiments, the rotation stage can be disposed over the translation stage. In some embodiment, the translation stage can be disposed over the rotation stage.

In some embodiments, a method includes measuring light reflected from a tapered interior surface of one of a plurality of tapered structures on a substrate at about 90 degrees to the tapered interior surface by a detector tilted at a first angle. The substrate can be held horizontally by a measuring stage. Each of the plurality of tapered structures can have the tapered interior surface, a longitudinal axis, a first opening and a second opening at two opposite ends of each of the plurality of tapered structures. The first angle can be set based on a second angle between the tapered interior surface and the longitudinal axis. The method further includes determining a characteristic of the tapered interior surface of the one of the plurality of tapered structures, comparing the determined characteristic to a threshold, and outputting a signal in response to the determined characteristic being above the threshold.

In some embodiments, the first angle can be up to about 60 degrees between the detector and the longitudinal axis. In some embodiments, the second angle can be about 30 degrees between the tapered interior surface and the longitudinal axis.

In some embodiments, the method can further include directing light from the tapered interior surface onto the detector using a fold mirror positioned at about 45 degrees to the detector.

In some embodiments, an apparatus includes a measuring stage and a detector. The measuring stage can be configured to hold a substrate horizontally. The substrate can have a plurality of tapered structures and each of the plurality of tapered structures comprises a tapered interior surface, a longitudinal axis, a first opening and a second opening at two opposite ends of each of the plurality of tapered structures. The detector can be tilted at a first angle to measure light reflected from the tapered interior surface of one of the plurality of tapered structures at about 90 degrees to the tapered interior surface. The first angle can be set based on a second angle between the tapered interior surface and the longitudinal axis.

In some embodiments, the detector can further include a fold mirror located on the detector. The fold mirror and the detector can have a third angle about 45 degrees and direct the reflected light to the detector. In some embodiments, a single image can be collected for each bore. In some embodiments, a plurality of images around or covering a bore can be collected.

Further features and advantages of the disclosure, as well as the structure and operation of various embodiments of the disclosure, are described in detail below with reference to the accompanying drawings. It is noted that the disclosure is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present disclosure and, together with the description, further serve to explain the principles of the disclosure and to enable a person skilled in the relevant art(s) to make and use the disclosure.

FIGS. 5A and 5B are schematic cross-sectional views of a measuring system with a translation stage and a rotation stage to measure a bore on a substrate, according to some embodiments.

Figure 1:
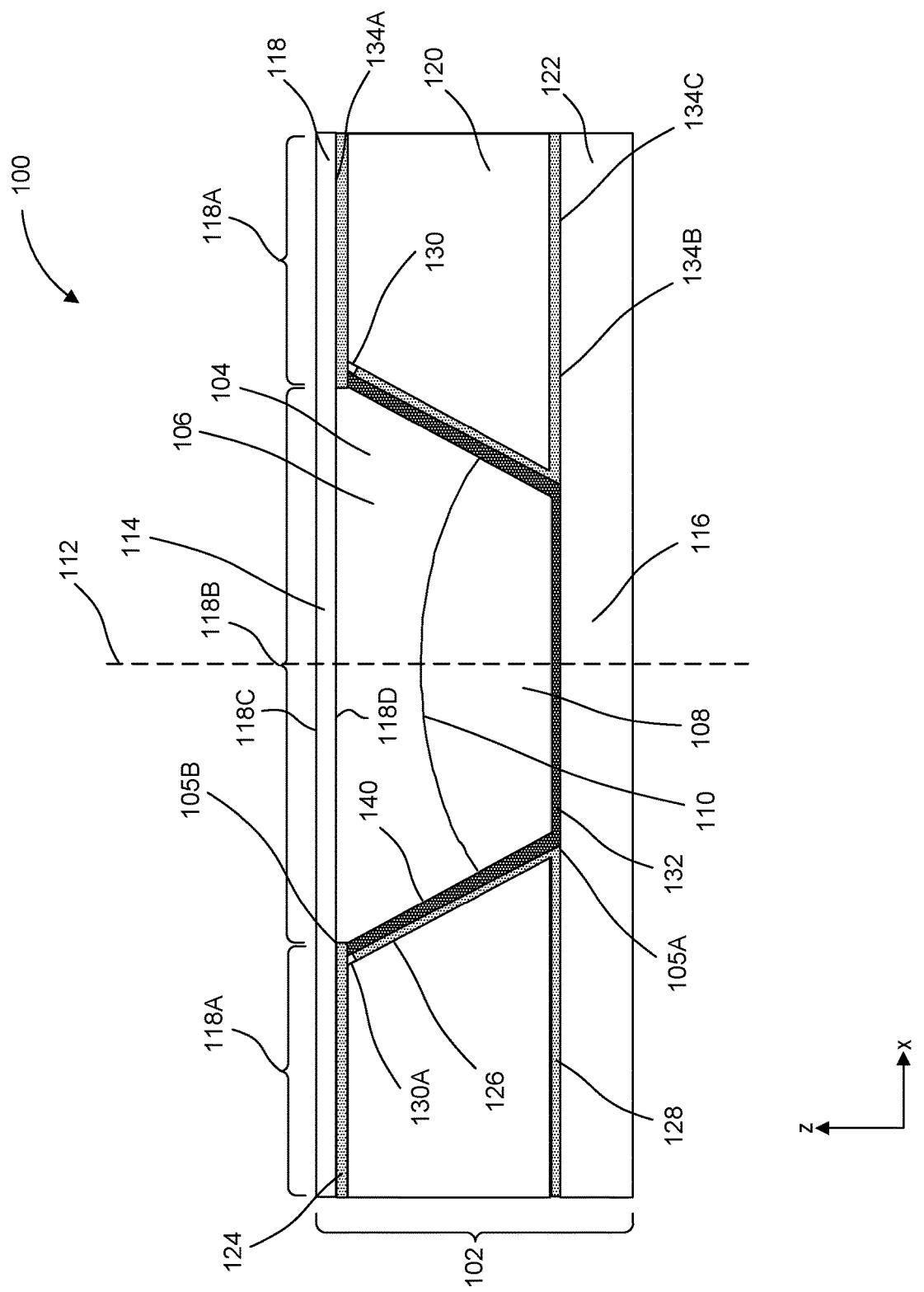
FIG. 1 is a schematic cross-sectional view of a liquid lens apparatus, according to some embodiments.

The features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. Additionally, generally, the left-most digit(s) of a reference number identifies the drawing in which the reference number first appears. Unless otherwise indicated, the drawings provided throughout the disclosure should not be interpreted as to-scale drawings.

DETAILED DESCRIPTION

This specification discloses one or more embodiments that incorporate the features of this disclosure. The disclosed embodiment(s) are merely exemplary. The scope of the disclosure is not limited to the disclosed embodiment(s), but rather is defined by the claims appended hereto.

The embodiment(s) described, and references in the specification to "one embodiment," "an embodiment," "an example embodiment," etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

Spatially relative terms, such as "beneath," "below," "lower," "above," "on," "upper," and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (e.g., rotated 90 degrees or at other orientations), and the spatially relative descriptors used herein may likewise be interpreted accordingly.

The term "about" or "substantially" as used herein indicates the value of a given quantity that can vary based on a particular technology. Based on the particular technology, the term "about" or "substantially" can indicate a value of a given quantity that varies within, for example, 1-15% of the value (e.g., ±1%, ±2%, ±5%, ±10%, or ±15% of the value).

Numerical values, including endpoints of ranges, can be expressed herein as approximations preceded by the term "about," "approximately," or the like. In such cases, other embodiments include the particular numerical values. Regardless of whether a numerical value is expressed as an approximation, two embodiments are included in this disclosure: one expressed as an approximation, and another not expressed as an approximation. It will be further understood that an endpoint of each range is significant both in relation to another endpoint, and independently of another endpoint.

Embodiments of the disclosure may be implemented in hardware, firmware, software, or any combination thereof. Embodiments of the disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, and/or instructions may be described herein as performing certain actions. However, it should be appreciated that such descriptions are merely for convenience and that such actions in fact result from computing devices, processors, controllers, or other devices executing the firmware, software, routines, instructions, etc.

Exemplary Liquid Lens Apparatus

Liquid lenses generally include two immiscible liquids disposed within a cavity disposed between a first window and a second window. Varying an electric field to which the liquids are subjected can vary the wettability of one of the liquids with respect to the cavity wall, thereby varying the shape of the meniscus formed between the two liquids and, thus, changing the optical focal length of the liquid lens.

FIG. 1 illustrates a schematic cross-sectional view of liquid lens apparatus 100, according to some embodiments. In some embodiments, liquid lens apparatus 100 can include a lens body 102 and a cavity 104 formed in the lens body 102. A first liquid 106 and a second liquid 108 can be disposed within cavity 104. In some embodiments, first liquid 106 can be a polar liquid or a conducting liquid. Additionally, or alternatively, second liquid 108 can be a non-polar liquid or an insulating liquid. In some embodiments, first liquid 106 and second liquid 108 have different refractive indices such that an interface 110 between first liquid 106 and second liquid 108 forms a lens. In some embodiments, first liquid 106 and second liquid 108 have substantially the same density, which can help to avoid changes in the shape of interface 110 as a result of changing the physical orientation of liquid lens apparatus 100 (e.g., as a result of gravitational forces).

In some embodiments, first liquid 106 and second liquid 108 can be in direct contact with each other at interface 110. For example, first liquid 106 and second liquid 108 can be substantially immiscible with each other such that the contact surface between first liquid 106 and second liquid 108 defines interface 110. In some embodiments, first liquid 106 and second liquid 108 can be separated from each other at interface 110. For example, first liquid 106 and second liquid 108 can be separated from each other by a membrane (e.g., a polymeric membrane) that defines interface 110.

In some embodiments, cavity 104 can be defined by a bore, or a tapered structure in an intermediate layer 120 of liquid lens apparatus 100, as described herein. In some embodiments, at least a portion of first liquid 106 can be disposed in cavity 104. Additionally, or alternatively, second liquid 108 can be disposed within cavity 104. For example, substantially all or a portion of second liquid 108 can be disposed within cavity 104. In some embodiments, the perimeter of interface 110 (e.g., the edge of the interface in contact with the sidewall 140 of the cavity 104) can be disposed within cavity 104.

Interface 110 can be adjusted via electrowetting. Electrowetting is a modification of the wetting properties or wettability (e.g., ability of a liquid to maintain contact with a surface) of a surface with an applied electric field. For example, a voltage can be applied between first liquid 106 and a surface of cavity 104 (e.g., an electrode positioned near the surface of the cavity 104 and insulated from first liquid 106, as described herein) to increase or decrease the wettability of the surface of the cavity 104 with respect to the first liquid 106 and change the shape of interface 110. In some embodiments, adjusting interface 110 changes the shape of the interface, which changes the focal length or focus of liquid lens apparatus 100. For example, such a change of focal length can enable liquid lens apparatus 100 to perform an autofocus function. Additionally, or alternatively, adjusting interface 110 tilts the interface relative to a structural axis 112 of liquid lens apparatus 100 (e.g., to tilt an optical axis of liquid lens apparatus 100 relative to the structural axis of liquid lens apparatus 100). For example, such tilting can enable liquid lens apparatus 100 to perform an optical image stabilization (OIS) function. Adjusting interface 110 can be achieved without physical movement of liquid lens apparatus 100 relative to an image sensor, a fixed lens or lens stack, a housing, or other components of a camera module in which liquid lens apparatus 100 can be incorporated.

In some embodiments, lens body 102 of liquid lens apparatus 100 can include a first window 114 and a second window 116. In some of such embodiments, cavity 104 can be disposed between first window 114 and second window 116. In some embodiments, lens body 102 can include a plurality of layers that cooperatively form the lens body 102. For example, in the embodiments shown in FIG. 1, lens body 102 can include a first outer layer, or first substrate, 118, an intermediate layer, or second substrate, 120, and a second outer layer, or third substrate, 122. In some embodiments, first substrate 118 can be a flexible membrane. First substrate 118 can include a central portion 118B and a peripheral portion 118A. In some embodiments, central portion 118B can coincide with first window 114. First substrate 118 can include an exterior side 118C (e.g., upper surface of lens body 102) and an interior side 118D (e.g., facing first liquid 106). In some embodiments, second substrate 120 can include a bore formed therethrough. For example, second substrate 120 can include cavity 104. First substrate 118 can be bonded to one side (e.g., the object side) of second substrate 120. For example, first substrate 118 (e.g., peripheral portion 118A) can be bonded to second substrate 120 at a bond 134A. Bond 134A can be an adhesive bond, a laser bond (e.g., a laser weld), or another suitable bond capable of maintaining first liquid 106 and second liquid 108 within cavity 104 (e.g., sealing first liquid 106 and second liquid 108 within cavity 104, or hermetically sealing cavity 104). Additionally, or alternatively, third substrate 122 can be bonded to the other side (e.g., the image side) of second substrate 120 (e.g., opposite first substrate 118). For example, third substrate 122 can bonded to second substrate 120 at a bond 134B and/or a bond 134C, each of which can be configured as described herein with respect to bond 134A. In some embodiments, intermediate layer 120 can be disposed between first outer layer 118 and second outer layer 122, the bore in the intermediate layer 120 can be covered on opposing sides by the first outer layer 118 and the second outer layer 122, and at least a portion of cavity 104 can be defined within the bore. Thus, a portion of first outer layer 118 covering cavity 104 serves as first window 114, and a portion of second outer layer 122 covering cavity 104 serves as second window 116.

In some embodiments, cavity 104 can be defined by the bore in intermediate layer 120. In some embodiments, cavity 104 can be tapered as shown in FIG. 1 such that a cross-sectional area of at least a portion of the cavity decreases along structural axis 112 in a direction from the object side (e.g., first substrate 118) toward the image side (e.g., third substrate 122). For example, cavity 104 can include a narrow end 105A and a wide end 105B. The terms "narrow" and "wide" are relative terms, meaning the narrow end is narrower, or has a smaller width or diameter, than the wide end. Such a tapered cavity 104, or a portion thereof can have a substantially truncated conical cross-sectional shape. Additionally, or alternatively, such a tapered cavity 104 can help to maintain alignment of interface 110 between first liquid 106 and second liquid 108 along structural axis 112. In other embodiments, cavity 104 can be tapered such that the cross-sectional area of cavity 104 increases along structural axis 112 in the direction from the object side (e.g., first substrate 118) to the image side (e.g., third substrate 122) or non-tapered such that the cross-sectional area of cavity 104 remains substantially constant along structural axis 112. In some embodiments, cavity 104 can be rotationally symmetrical (e.g., about structural axis 112 of liquid lens apparatus 100).

In some embodiments, image light can enter liquid lens apparatus 100 through first window 114, can be refracted at interface 110 between first liquid 106 and second liquid 108, and can exit liquid lens apparatus 100 through second window 116. In some embodiments, first outer layer 118 and/or second outer layer 122 can include a sufficient transparency to enable passage of the image light. For example, first outer layer 118 and/or second outer layer 122 can include a polymeric, glass, ceramic, glass-ceramic material, or the like. In some embodiments, outer surfaces of first outer layer 118 and/or second outer layer 122 can be substantially planar. Thus, even though liquid lens apparatus 100 can function as a lens (e.g., by refracting image light passing through interface 110), outer surfaces of liquid lens apparatus 100 can be flat as opposed to being curved like the outer surfaces of a fixed lens. Such planar outer surfaces can make integrating liquid lens apparatus 100 into an optical assembly (e.g., a lens stack) less difficult. In other embodiments, outer surfaces of the first outer layer 118 and/or the second outer layer 122 are curved (e.g., concave or convex). Thus, liquid lens apparatus 100 can include an integrated fixed lens. In some embodiments, intermediate layer 120 can include a metallic, polymeric, glass, ceramic, glass-ceramic material, or the like. Because image light can pass through the bore (e.g., cavity 104) in intermediate layer 120, intermediate layer 120 may or may not be transparent.

Although lens body 102 of liquid lens apparatus 100 is described as including first outer layer 118, intermediate layer 120, and second outer layer 122, other embodiments are included in this disclosure. For example, in some other embodiments, one or more of the layers can be omitted. For example, the bore in intermediate layer 120 can be configured as a blind hole that does not extend entirely through intermediate layer 120, and second outer layer 122 can be omitted. In some embodiments, cavity 104 can be disposed within the bore in intermediate layer 120. Thus, a first portion of cavity 104 can be an upper portion of the bore, and a second portion of cavity 104 can be a lower portion of the bore. In some other embodiments, cavity 104 can be disposed partially within the bore in intermediate layer 120 and partially outside the bore.

In some embodiments, liquid lens apparatus 100 can include a common electrode 124 in electrical communication with first liquid 106. Additionally, or alternatively, liquid lens apparatus 100 can include a driving electrode 126 disposed on a sidewall 140 of cavity 104 and insulated from first liquid 106 and second liquid 108. Different voltages can be supplied to common electrode 124 and driving electrode 126 to change the shape of interface 110 as described herein.

In some embodiments, liquid lens apparatus 100 can include a conductive layer 128, at least a portion of which is disposed within cavity 104 and/or defines at least a portion of the sidewall 140 of the cavity 104. For example, conductive layer 128 can include a conductive coating applied to intermediate layer 120 prior to bonding first outer layer 118 and/or second outer layer 122 to intermediate layer 120. Conductive layer 128 can include a metallic material, a conductive polymer material, another suitable conductive material, or a combination thereof. Additionally, or alternatively, conductive layer 128 can include a single layer or a plurality of layers, some or all of which can be conductive. In some embodiments, conductive layer 128 can define common electrode 124 and/or driving electrode 126. For example, conductive layer 128 can be applied to substantially the entire outer surface of intermediate layer 120 prior to bonding first outer layer 118 and/or second outer layer 122 to intermediate layer 120. Following application of conductive layer 128 to intermediate layer 120, conductive layer 128 can be segmented into various conductive elements (e.g., common electrode 124, driving electrode 126, and/or other electrical devices). In some embodiments, liquid lens apparatus 100 can include one or more scribes 130 in conductive layer 128 to isolate (e.g., electrically isolate) common electrode 124 and driving electrode 126 from each other. For example, scribe 130A can be formed by a photolithographic process, a laser process (e.g., laser ablation), or another suitable scribing process. In some embodiments, scribes 130 can include a gap in conductive layer 128. For example, scribe 130A can be a gap with a width of about 5 µm, about 10 µm, about 15 µm, about 20 µm, about 25 µm, about 30 µm, about 35 µm, about 40 µm, about 45 µm, about 50 µm, or any ranges defined by the listed values.

Although conductive layer 128 is described in reference to FIG. 1 as being segmented following application to intermediate layer 120, other embodiments are included in this disclosure. For example, in some embodiments, conductive layer 128 can be patterned during application to intermediate layer 120. For example, a mask can be applied to intermediate layer 120 prior to applying conductive layer 128 such that, upon application of conductive layer 128, masked regions of intermediate layer 120 covered by the mask can correspond to the gaps in conductive layer 128, and upon removal of the mask, the gaps are formed in conductive layer 128.

In some embodiments, liquid lens apparatus 100 can include an insulating layer 132 disposed within cavity 104. For example, insulating layer 132 can include an insulating coating applied to intermediate layer 120 prior to bonding first outer layer 118 and/or second outer layer 122 to intermediate layer 120. In some embodiments, insulating layer 132 can include an insulating coating applied to conductive layer 128 and second window 116 after bonding second outer layer 122 to intermediate layer 120 and prior to bonding first outer layer 118 to intermediate layer 120. Thus, insulating layer 132 can cover at least a portion of conductive layer 128 within cavity 104 (e.g., driving electrode 126) and second window 116. In some embodiments, insulating layer 132 can be sufficiently transparent to enable passage of image light through second window 116 as described herein. Insulating layer 132 can include polytetrafluoroethylene (PTFE), parylene, another suitable polymeric or non-polymeric insulating material, or a combination thereof. Additionally, or alternatively, insulating layer 132 can include a hydrophobic material. Additionally, or alternatively, insulating layer 132 can include a single layer or a plurality of layers, some or all of which can be insulating.

In some embodiments, insulating layer 132 can cover at least a portion of driving electrode 126 (e.g., the portion of the driving electrode disposed within cavity 104) to insulate first liquid 106 and second liquid 108 from driving electrode 126. Additionally, or alternatively, at least a portion of common electrode 124 can be disposed within cavity 104 and uncovered by insulating layer 132. Thus, common electrode 124 can be in electrical communication with first liquid 106 as described herein. In some embodiments, insulating layer 132 can include a hydrophobic surface layer in cavity 104. Such a hydrophobic surface layer can help to maintain second liquid 108 within a lower portion of cavity 104 (e.g., by attraction between the non-polar second liquid 108 and the hydrophobic material) and/or enable the perimeter of interface 110 to move along the hydrophobic surface layer (e.g., by electrowetting) to change the shape of the interface 110 as described herein.

Figure 2:
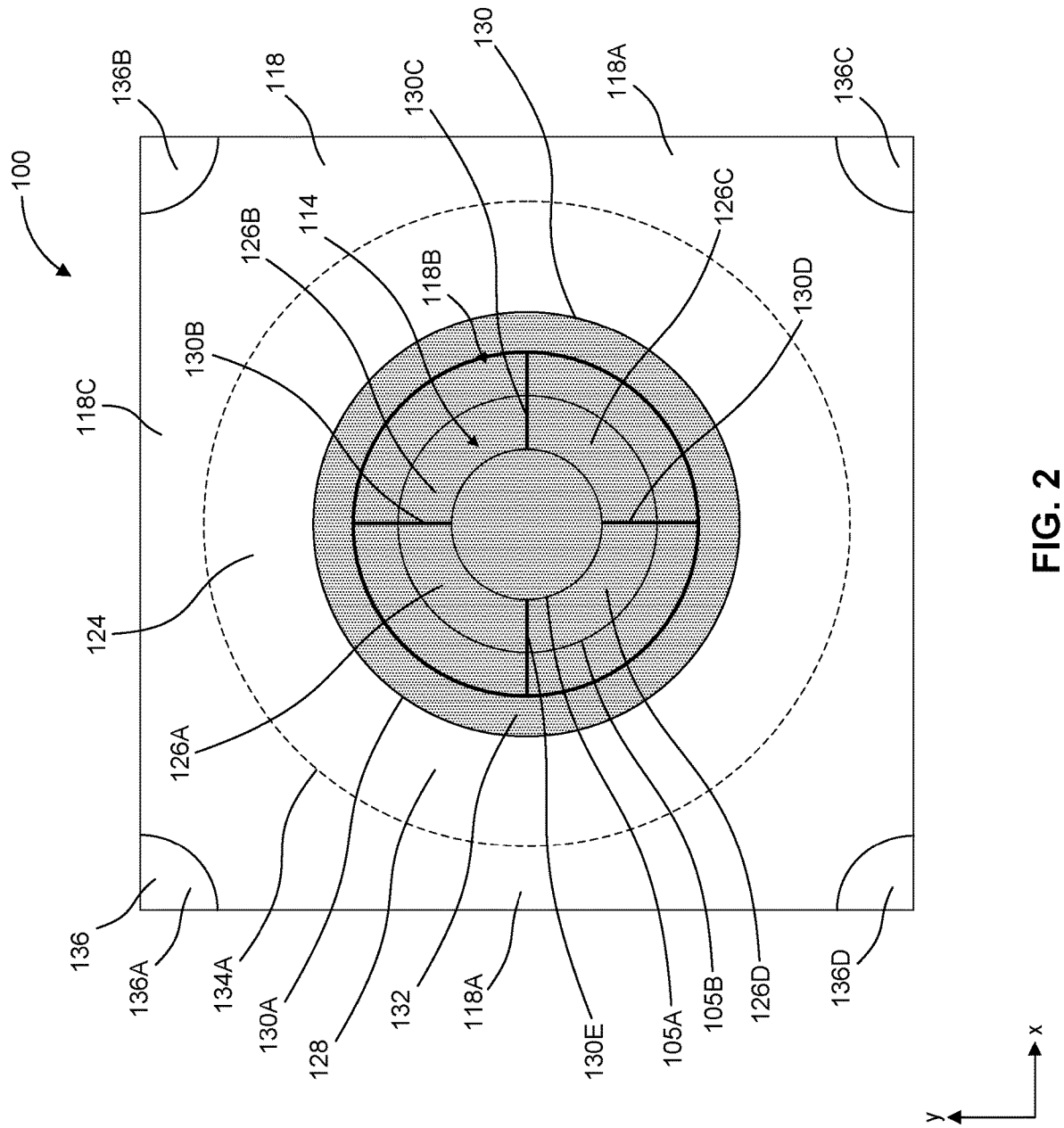
FIG. 2 is a schematic top plan view of the liquid lens apparatus of FIG. 1, according to some embodiments.

FIG. 2 illustrates a schematic top plan view of liquid lens apparatus 100 shown in FIG. 1, looking through first outer layer 118, according to some embodiments. For clarity in FIG. 2, and with some exceptions, bonds (e.g., 134A, 134B, 134C) generally are shown in dashed lines, scribes (e.g., 130, 130A, 130B, 130C, 130D, 130E) generally are shown in heavier lines, and other features generally are shown in lighter lines.

In some embodiments, common electrode 124 is defined between scribe 130A and an outer edge of liquid lens apparatus 100. A portion of common electrode 124 can be uncovered by insulating layer 132 such that common electrode 124 can be in electrical communication with first liquid 106 as described herein. In some embodiments, bond 134A can be configured such that electrical continuity can be maintained between the portion of conductive layer 128 inside the bond (e.g., inside cavity 104 and/or between the bond and scribe 130A) and the portion of conductive layer 128 outside the bond (e.g., outside cavity 104 and/or outside the bond). In some embodiments, liquid lens apparatus 100 can include one or more cutouts 136 in first outer layer 118. For example, as shown in FIG. 2, liquid lens apparatus 100 can include a first cutout 136A, a second cutout 136B, a third cutout 136C, and a fourth cutout 136D. In some embodiments, cutouts 136 can include portions of liquid lens apparatus 100 at which first outer layer 118 is removed to expose conductive layer 128. Thus, cutouts 136 can enable electrical connection to common electrode 124, and the regions of conductive layer 128 exposed at the cutouts can serve as contacts to enable electrical connection of liquid lens apparatus 100 to a controller, a processor, a driver, or another component of a lens or camera system.

Although cutouts 136 are described herein as being positioned at corners of liquid lens apparatus 100, other embodiments are included in this disclosure. For example, in some embodiments, one or more of the cutouts 136 can be disposed inboard of the outer perimeter of liquid lens apparatus 100 and/or along one or more edges of liquid lens apparatus 100.

In some embodiments, driving electrode 126 can include a plurality of driving electrode segments. For example, as shown in FIG. 2, driving electrode 126 can include a first driving electrode segment 126A, a second driving electrode segment 126B, a third driving electrode segment 126C, and a fourth driving electrode segment 126D. In some embodiments, the driving electrode segments 126A-126D can be distributed substantially uniformly about sidewall 140 of cavity 104. For example, each driving electrode segment can occupy about one quarter, or one quadrant, of sidewall 140 of cavity 104. In some embodiments, adjacent driving electrode segments 126A-126D are isolated from each other by a scribe. For example, first driving electrode segment 126A and second driving electrode segment 126B can be isolated from each other by scribe 130B. Additionally, or alternatively, second driving electrode segment 126B and third driving electrode segment 126C are isolated from each other by a scribe 130C. Additionally, or alternatively, third driving electrode segment 126C and fourth driving electrode segment 126D are isolated from each other by a scribe 130D. Additionally, or alternatively, fourth driving electrode segment 126D and first driving electrode segment 126A are isolated from each other by a scribe 130E. The various scribes 130 can be configured as described herein in reference to scribe 130A. In some embodiments, the scribes between the various electrode segments extend beyond cavity 104 and onto the back side of liquid lens apparatus 100 (not shown). Such a configuration can ensure electrical isolation of the adjacent driving electrode segments 126A-126D from each other. Additionally, or alternatively, such a configuration can enable each driving electrode segment 126A-126D to have a corresponding contact for electrical connection as described herein.

Although driving electrode 126 is described herein as being divided into four driving electrode segments 126A-126D, other embodiments are included in this disclosure. In some other embodiments, driving electrode 126 can include a single driving electrode (e.g., substantially circumscribing sidewall 140 of cavity 104). For example, the liquid lens comprising such a single driving electrode can be capable of varying focal length, but incapable of tilting the interface (e.g., an autofocus only liquid lens). In some other embodiments, the driving electrode 126 can be divided into two, three, five, six, seven, eight, or more driving electrode segments (e.g., distributed substantially uniformly about sidewall 140 of cavity 104).

In some embodiments, bond 134B and/or bond 134C can be configured such that electrical continuity is maintained between the portion of conductive layer 128 inside the respective bond and the portion of the conductive layer outside the respective bond. In some embodiments, liquid lens apparatus 100 can include one or more cutouts 136 in second outer layer 122. For example, liquid lens apparatus 100 can include similar cutouts 136A-136D, shown in FIG. 2 in first outer layer 118, in second outer layer 122. In some embodiments, cutouts 136 can include portions of liquid lens apparatus 100 at which second outer layer 122 is removed to expose conductive layer 128. Thus, cutouts 136 can enable electrical connection to driving electrode 126, and the regions of conductive layer 128 exposed at cutouts 136 can serve as contacts to enable electrical connection of liquid lens apparatus 100 to a controller, a processor, a driver, or another component of a lens or camera system.

Different driving voltages can be supplied to different driving electrode segments to tilt the interface of liquid lens apparatus 100 (e.g., for OIS functionality). For example, tilting interface 110 can cause an angle to be formed between the optical axis of liquid lens apparatus 100 (e.g., the optical axis of interface 110) and structural axis 112 of liquid lens apparatus 100. In some embodiments, such an angle can be referred to as a mechanical tilt angle, and an optical tilt angle of liquid lens apparatus 100 can be determined by multiplying the mechanical tilt angle by the refractive index difference $\Delta n$ between first liquid 106 and second liquid 108. Additionally, or alternatively, a driving voltage can be supplied to a single driving electrode or the same driving voltage can be supplied to each driving electrode segment to maintain interface 110 of liquid lens apparatus 100 in a substantially spherical orientation about structural axis 112 (e.g., for autofocus functionality) and/or to maintain the optical axis in alignment with structural axis 112.

In some embodiments, first outer layer 118 can include a peripheral portion 118A, a central portion 118B, an exterior side 118C, and an interior side 118D, as shown in FIG. 1. For example, peripheral portion 118A can be disposed laterally outboard (or farther from structural axis 112) of central portion 118B. In some embodiments, central portion 118B can include first window 114. For example, central portion 118B can at least partially overlie cavity 104, whereby at least a portion of central portion 118B of first outer layer 118 can serve as first window 114. In some embodiments, peripheral portion 118A of first outer layer 118 can be bonded to intermediate layer 120 (e.g., at bond 134A) as described herein. In some embodiments, first outer layer 118 can include a monolithic or unitary body (e.g., formed from a single piece of material such as, for example, a glass substrate). For example, each of peripheral portion 118A and central portion 118B can be part of the monolithic first outer layer 118.

In some embodiments, first outer layer 118 can include a thinned region or membrane. For example, the thinned region can have a lower stiffness than peripheral portion 118A and/or central portion 118B of first outer layer 118, which can enable first window 114 to move or expand (e.g., translate axially) as described herein. In some embodiments, the thinned region can comprise an annular thinned region, which can at least partially circumscribe first window 114 and/or cavity 104. In some embodiments, central portion 118B can include a thinned region or membrane. For example, the thinned region can be in communication with the bore in intermediate layer 120, as shown in FIG. 1, such that the bore and the thinned region cooperatively define cavity 104.

In some embodiments, central portion 118B of first outer layer 118 enables first window 114 to translate relative to peripheral portion 118A in the axial direction. For example, a reduced stiffness of a thinned region of central portion 118B compared to peripheral portion 118A can enable the first outer layer 118 to flex or bend at the thinned region (e.g., central portion 118B). Such flexing or bending can be caused, for example, by expansion or contraction of first liquid 106 and/or second liquid 108 within cavity 104 (e.g., as a result of an increase or decrease in temperature), by physical shock to first outer layer 118, or by another force exerted on first outer layer 118 (e.g., from inside or outside cavity 104). Such flexing or bowing of central portion 118B and first window 114 can cause a change in optical power (e.g., focal length or focus) of liquid lens apparatus 100 resulting from a change in curvature of first window 114.

In some embodiments, a thickness of peripheral portion 118A of first outer layer 118 is substantially the same as a thickness of central portion 118B and/or first window 114. Additionally, or alternatively, a substantially uniform thickness of peripheral portion 118A and central portion 118B and/or first window 114, can enable first outer layer 118 to be formed from a substantially planar sheet of material without thinning the central portion 118B and/or the first window 114 (e.g., without etching, grinding, or polishing the central portion and/or the first window to reduce the thickness thereof). Avoiding such a thinning step can help to maintain the surface quality of first window 114, which can improve the image quality of liquid lens apparatus 100 compared to liquid lenses with thinned window regions. Additionally, or alternatively, avoiding such a thinning step can reduce the number of steps involved in manufacturing first outer layer 118 compared to liquid lenses with thinned window regions, thereby simplifying production of liquid lens apparatus 100. In some embodiments, a thickness of first outer layer 118 can be about 25 µm to about 250 µm. For example, central portion 118B and/or first window 114 can have a thickness of about 25 µm to about 50 µm.

In some embodiments, cavity 104 can include a sidewall 140 extending between first outer layer 118 and second window 116. For example, sidewall 140 can be defined by the bore in intermediate layer 120 (e.g., a wall of the bore) and/or conductive layer 128 (e.g., a portion of the conductive layer disposed on a portion of the wall of the bore). In some embodiments, sidewall 140 can be straight (e.g., along the sidewall of cavity 104 in the axial direction). For example, the deviation of sidewall 140 from linear, measured along an entire height of the sidewall in the axial direction, is at most about 50 µm, at most about 40 µm, at most about 30 µm, at most about 20 µm, at most about 10 µm, at most about 5 µm, or any ranges defined by the listed values.

Exemplary Measuring System to Measure a Bore on a Substrate

In some embodiments, a cavity of liquid lenses is defined by a bore on a plate of liquid lenses. The bore can be a tapered structure on the plate. Surface quality of the tapered wall of the bore can be critical to liquid lenses performance. Surface quality can include tapered wall surface roughness, defects, linearity, shape, and the like. The tapered wall surface quality can change with the lifetime of a mold producing the bore, as well as the position of the bore on a substrate during manufacturing. Accordingly, measuring and monitoring the tapered wall surface quality can be of high importance for quality control of bores and liquid lenses manufacturing processes.

In some embodiments, during bore manufacturing process a substrate (e.g., a 150 mm wafer or a 25 mm×35 mm coupon) can be produced that includes multiple bores. In some embodiments, the bores can be measured by breaking apart or dicing the substrate to measure small portions. Destructive sampling may not be desired in all cases. In some embodiments, the bores on the edge of the substrate can be measured nondestructively by tilting the substrate at an angle. However, if there are variations across bore characteristics, this sampling of less than all can become a problem. Therefore, what is needed is the ability to nondestructively measure all or substantially all the bores with high throughput.

Figure 3:
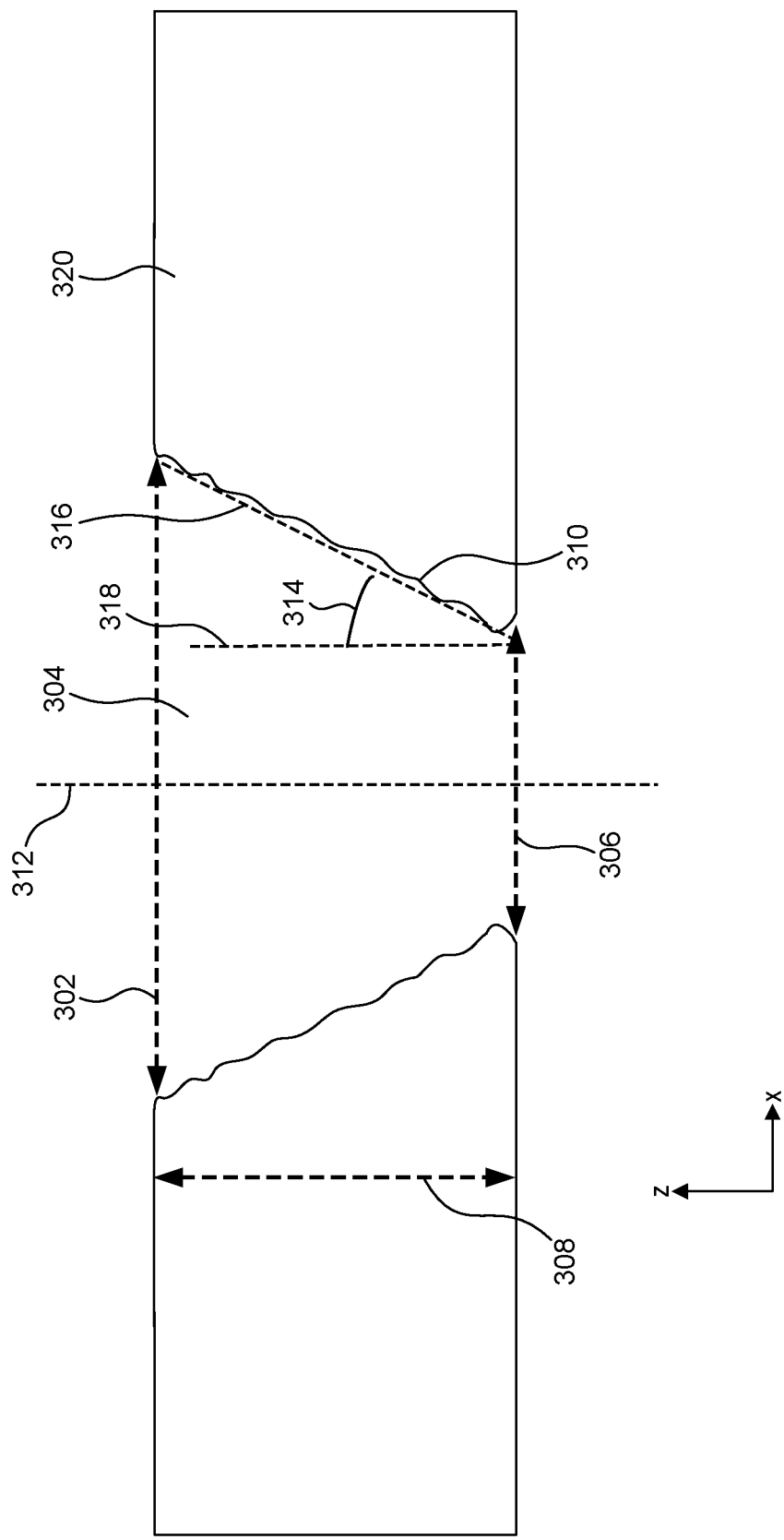
FIG. 3 is a schematic cross-sectional view of a bore on a substrate, according to some embodiments.

FIG. 3 illustrates a schematic cross-sectional view of a bore 304 in a substrate 320, according to some embodiments. In some embodiments, substrate 320 can be a 150 mm wafer, a 25 mm×35 mm coupon, or other forms of plates. In some embodiments, the material of substrate 320 can be similar as intermediate layer 120, including a metallic, polymeric, glass, ceramic, glass-ceramic material, or the like. And image light can pass through bore 304 in substrate 320, so substrate 320 may or may not be transparent. In some embodiments, substrate 320 can include one or more layers (e.g., conductive layer 128 and/or insulating layer 132) disposed thereon. Thus, the methods described herein can be used to determine the characteristics of bare substrate 320, conductive layer 128, and/or insulating layer 132.

In some embodiments, substrate 320 can include multiple bores at a variety of distances and patterns across substrate 320 (not shown in FIG. 3). For example, bores can be tapered structures formed in substrate 320 by a variety of processes, including pressing with pins, laser cutting and other available processes. Different processes can produce different characteristics of the bores. Characteristics of bores can include roughness, linearity, defects, shape, geometry, position, roll-off, and other related parameters. As shown in FIG. 3, bore 304 can include a first opening 302, a second opening 306, a tapered wall 310, and a longitudinal axis 312 running through bore 304. A tapered surface 316 of tapered wall 310 can form an angle 314 with longitudinal axis 318, which is parallel to longitudinal axis 312.

In some embodiments, angle 314 can range from about 0 degree to about 60 degrees. For example, angle 314 between tapered surface 316 and longitudinal axis 318 can be about 30 degrees. In some embodiments, bore 304 can include segments with different angles 314. For example, bore 304 can include a first portion (e.g., an upper portion proximate first opening 302) and a second portion (e.g., a lower portion proximate second opening 306), and the first portion can have an angle 314 that is less than or greater than angle 314 of the second portion. Tapered wall 310 can have features on a nanometer scale, e.g., about 50 nm high, over tapered wall 310. Tapered wall 310 in FIG. 3 is for illustrative purposes only and is not to scale. In addition, tapered wall 310 may not reflect the actual geometry of the real structures, features, or surface. In some embodiments, first opening 302 and second opening 306 can have a diameter ranging from about 1.5 mm to about 2.5 mm. For example, first opening 302 can have a diameter about 2.4 mm and second opening 306 can have a diameter of about 1.5 mm. Bore 304 can have a height 308 ranging from about 0.3 mm to about 1 mm. For example, bore 304 can have a height of about 0.8 mm.

Figure 4:
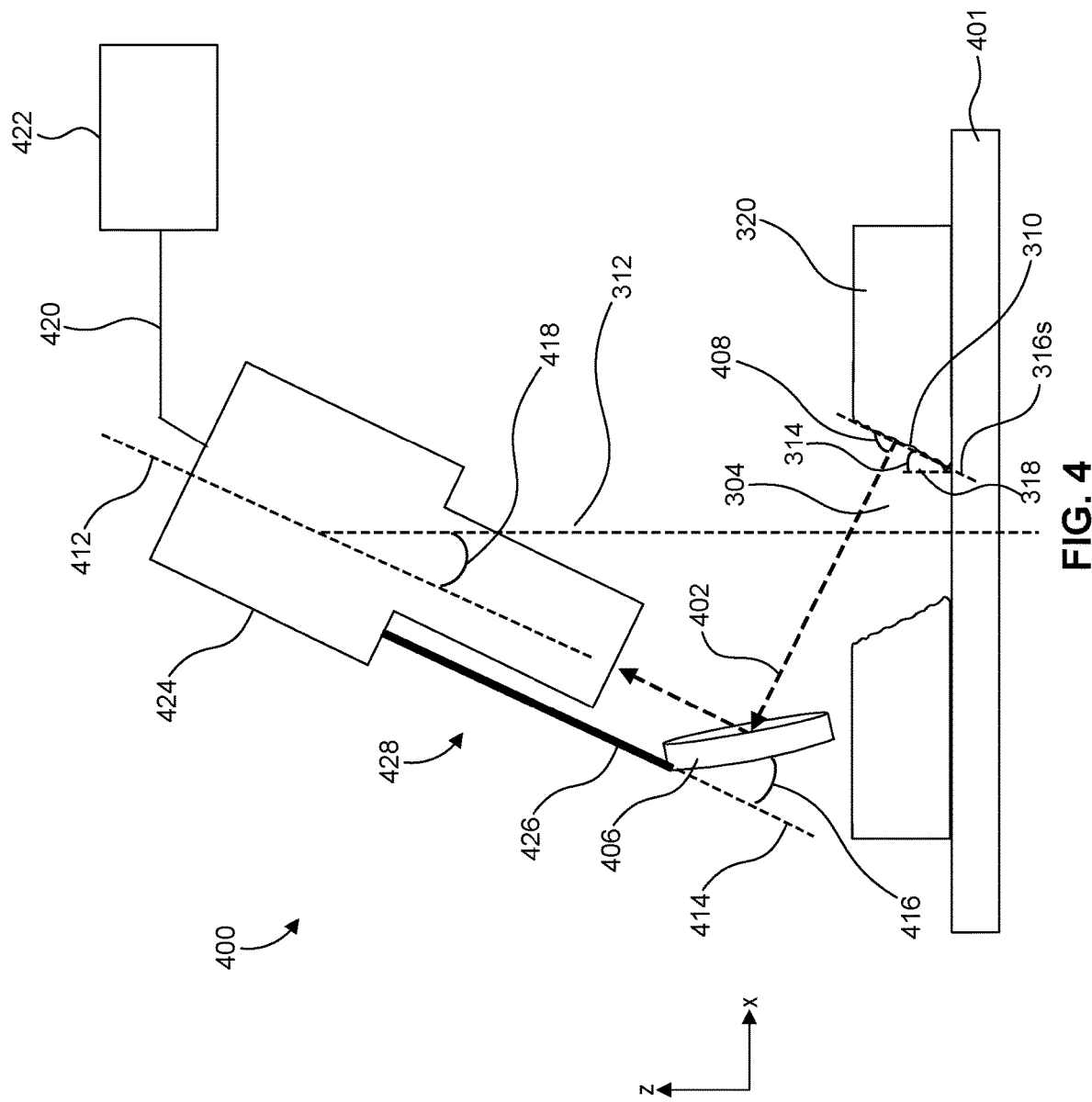
FIG. 4 is a schematic cross-sectional view of a measuring system with a fold mirror to measure a bore on a substrate, according to some embodiments.

FIG. 4 illustrates a schematic cross-sectional view of a measuring system 400 with a fold mirror to measure a bore on a substrate, according to some embodiments. In one example, measuring system 400 can include a measuring stage 401, a detector 428, and a measuring device 422. In one example, substrate 320 having bore 304 can be placed horizontally on measuring stage 401. Although one bore 304 is shown, more bores may be formed in substrate 320.

In some embodiments, detector 428 can further include a measuring head 424, a fold mirror 406, and a holding device 426 to secure fold mirror 406 on measuring head 424. In some embodiments, detector 428 can be a long working distance interferometer. For example, detector 428 can be a Bruker NPFLEX 3D optical microscope. In some embodiments, white light can be used to illuminate tapered wall 310. In some embodiments, green light or light having another suitable wavelength can be used to illuminate tapered wall 310.

In some embodiments, fold mirror 406 can be secured on measuring head 424 by holding device 426 with an angle 416 between fold mirror 406 and axis 414, which is parallel to axis 412 of measuring head 424. In some embodiments, angle 416 between fold mirror 406 and axis 414 can be about 45 degrees. In some embodiments, angle 416 between fold mirror 406 and axis 414 can be changed by holding device 426 from about 30 degrees to about 60 degrees. Fold mirror 406 can be set to direct light 402 reflected from tapered wall 310 to measuring head 424.

In some embodiments, measuring head 424 can be tilted to measure light 402 reflected from tapered wall 310. In one example, a portion of tapered wall 310 along longitudinal axis 312 can be measured by moving measuring stage 401 along longitudinal axis 312 (e.g., z direction). The measured light 402 can have an angle 408 with respect to tapered surface 316 of tapered wall 310. In some embodiments, angle 408 between light 402 and tapered surface 316 can be about 90 degrees. In some embodiments, measuring tapered wall 310 at angle 408 of about 90 degrees can improve image quality of surface characteristics for tapered wall 310. In some embodiments, measuring head 424 can have a long working distance (e.g., larger than about 10 mm). For example, measuring head 424 can have a long working distance of about 20 mm.

In some embodiments, measuring head 424 can be tilted at an angle 418 between longitudinal axis 312 of bore 304 and an axis 412 of measuring head 424. Tilted angle 418 can be set based on angle 314 between tapered surface 316 and longitudinal axis 318, such that reflected light 402 can be measured at angle 408 about 90 degrees. In some embodiments, angle 418 can range from about 0 degree to about 60 degrees. For example, angle 314 can be about 30 degrees, angle 408 can be about 90 degrees, angle 416 can be about 45 degrees, and angle 418 would be set about 30 degrees to tilt detector 428 to measure light reflected about 90 degrees from tapered wall 310.

In some embodiments, by using detector 428 including fold mirror 406 to measure tapered wall 310 the measuring can be accomplished without breaking substrate 320 or dicing bore 304 and without having to tilt substrate 320, thus reducing the cost of bore manufacturing process and improving throughput.

In some embodiments, measuring device 422 can be connected to detector 428 by communication line 420. Communication line 420 can be wired or wireless communication. In some embodiments, measuring device 422 can be integrated into detector 428. Measuring device 422 can obtain an image of tapered wall 310 from reflected light 402 measured by detector 428. Measuring device 422 can determine a surface characteristics of tapered wall 310, such as surface roughness, defects, shape, and linearity.

In some embodiments, detector 428 can collect a single image for each bore. In some embodiments, detector 428 can collect a plurality of images around or covering at least a portion of a bore. In some embodiments, for bore 304 including segments with different angles 314 (e.g., an upper portion and a second portion), detector 428 can collect images from the upper portion and then adjust angle 418 to collect images from the second portion. In some embodiments, detector 428 can obtain images of tapered wall 310 and measuring device 422 can determine surface characteristics from the images. In some embodiments, area parameters or line parameters may be extracted from the images. The area parameters and line parameters can include surface roughness, linearity, shape, defects, and other related parameters. In some embodiments, measuring system 400 can have a nanometer scale resolution over a micrometer measurement range to detect nanometer scale features on tapered wall 310. In some embodiments, measuring device 422 can determine if the surface characteristics are above or below a threshold. For example, a threshold of 100 nm can be set for bore manufacturing process. In some embodiments, when measuring device 422 determines that tapered wall 310 of bore 304 has surface roughness above a threshold, bore 304 may be rejected. In some embodiments, the above threshold roughness can be corrected by improving pressing pins for the measured or subsequently produced bores.

FIGS. 5A and 5B illustrate schematic cross-sectional views of measuring systems 500 and 550 with a translation stage and a rotation stage to measure a bore on a substrate, according to some embodiments. In some embodiments, FIG. 5A shows measuring system 500 can include a rotation stage 502 over a translation stage 504. In one example, rotation stage 502 can rotate horizontally (e.g., in x-y plane) around an axis 510 of rotation stage 502. In one example, translation stage 504 can move laterally in x direction and/or in y direction. Additionally, or alternatively, translation stage 504 can move longitudinally in z direction. In some embodiments, rotation stage 502 and translation stage 504 can move independently.

In some embodiments, substrate 320 having bore 304 can be placed horizontally on rotation stage 502. In this example, with rotation stage 502 over translation stage 504, substrate 320 can be rotated around axis 510 and moved laterally in x direction and y direction, therefore other bores (not shown in FIG. 5A) on substrate can also be measured by detector 428. For example, bores on substrate 320 can be measured at 0, 90, 180, and 270 degrees when rotation stage 502 rotates around axis 510. In this way, bores in different quadrants of substrate 320 can be measured and compared for bore manufacturing process quality control. And all the bores on substrate 320 can be measured by measuring system 500 with rotation stage 502 and translation stage 504.

Referring to FIG. 5B, in some embodiments measuring system 550 can include a translation stage 506 over a rotation stage 508. Translation stage 506 can move laterally in x direction and/or y direction. Additionally, or alternatively, translation stage 506 can move longitudinally in z direction. Rotation stage 508 can rotate horizontally (e.g., in x-y plane) around an axis 512 of rotation stage 508. In some embodiments, translation stage 506 and rotation stage 508 can move independently. Substrate 320 having bore 304 can be placed horizontally on translation stage 506. With translation stage 506 over rotation stage 508, substrate 320 can be moved laterally such that bore 304 on substrate 320 can be lined up with axis 512. Rotation stage 508 can rotate around axis 512 and multiple slices of tapered wall 310 can be measured. Such slices may be interpreted individually or assembled into a 3D image of the bore. Translation stage 506 can move in x direction and y direction such that each bore on substrate 320 can be measured.

In some embodiments, measuring systems 500 and 550 can have more than one rotation stage and more than one translation stage. In some embodiments, translation stage and rotation stage can be controlled by measuring device 422 to automatically move the stages to allow for measurement of tapered walls of bores on substrate 320. In some embodiment, measuring system 500 and 550 can measure each slice of tapered wall and each bore on substrate with automation, reduced measuring time, increased throughput, reduced number of tools and operators, and the like.

Figure 6:
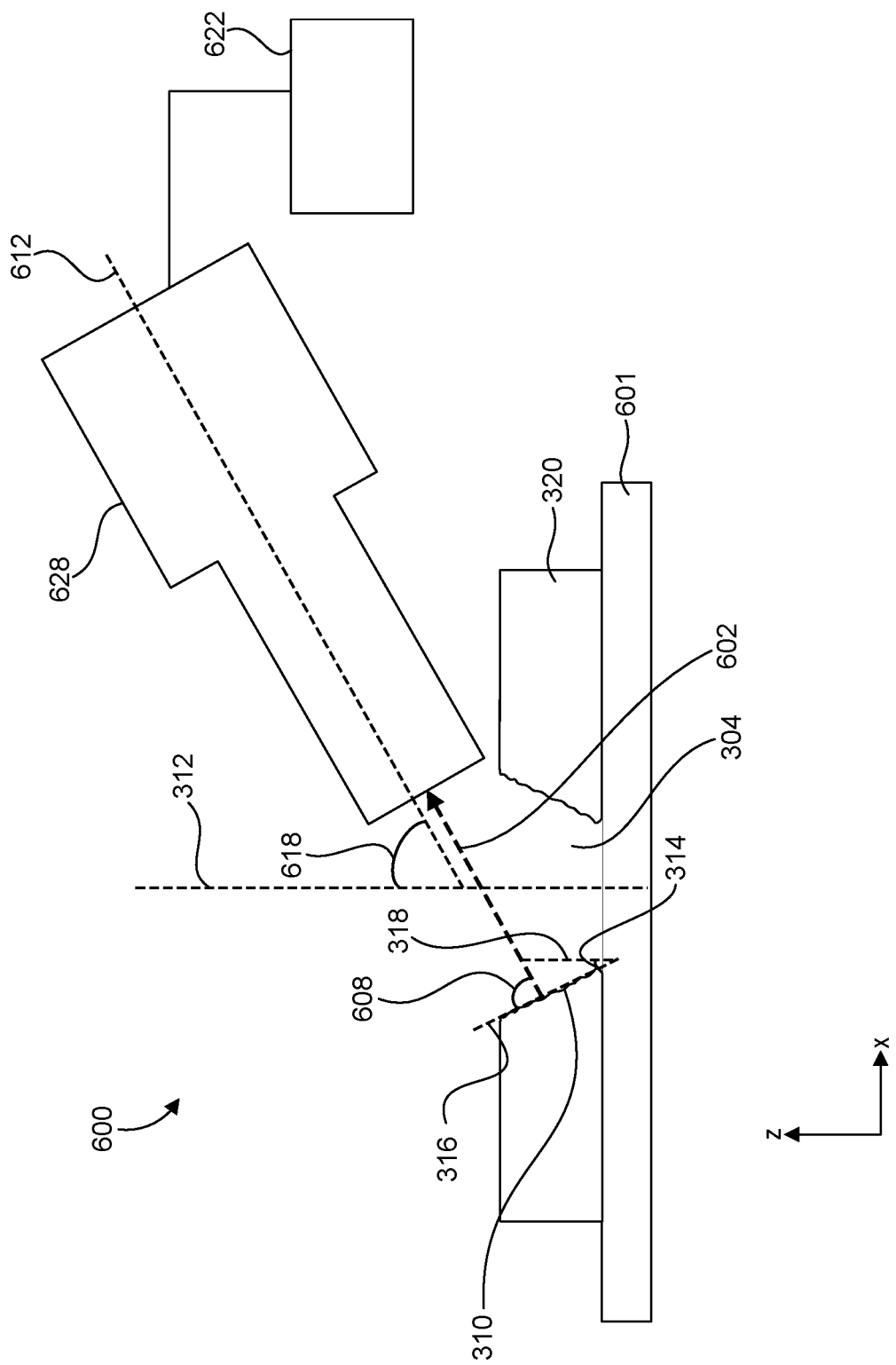
FIG. 6 is schematic cross-sectional view of another measuring system without a fold mirror to measure a bore on a substrate, according to some embodiments.

FIG. 6 illustrates schematic cross-sectional view of another measuring system 600 without a fold mirror to measure a bore on a substrate, according to some embodiments. In some embodiments, measuring system can include a measuring stage 601, a detector 628, and a measuring device 622. In some embodiments, measuring stage 601 and measuring device 622 can be similar as measuring stage 401 and measuring device 422, respectively.

In some embodiments, substrate 320 with bore 304 can be placed horizontally on measuring stage 601. In some embodiments, detector 628 can have very long working distance (e.g., more than about 25 mm, or about 50 mm). In some embodiments, detector 628 can be tilted at a larger angle from longitudinal axis 312 without contacting substrate 320. In some embodiments, detector 628 without a fold mirror can detect light 602 reflected from tapered wall 310 at an angle 608 of about 90 degrees.

In some embodiments, detector 628 can be tilted at an angle 618 between an axis 612 of detector 628 and longitudinal axis 312. In one example, tilted angle 618 can be set based on angle 314 between tapered surface 316 and longitudinal axis 318. For example, angle 314 can be about 30 degrees, angle 608 can be about 90 degrees, and then detector 628 would be tilted at angle 618 about 60 degrees to measure light reflected about 90 degrees from tapered wall 310.

In some embodiments, detector 628 can be a very long working distance interferometer. For example, detector 628 can be a 4D Technology NanoCam Sq optical surface profiler. Also for example, detector 628 can be an ISRA Vision NetGAGE Michelson interferometer measuring tapered surface 316 by vertical scanning interferometry. In some embodiments, very long working distance detector 628 uses modification on the enclosure of detector 628 to measure each bore on substrate 320. In some embodiments, measuring stage 601 can include a rotation stage and a translation stage. In some embodiments, measuring stage 601 can include more than one rotation stage and more than one translation stage.

Figure 7:
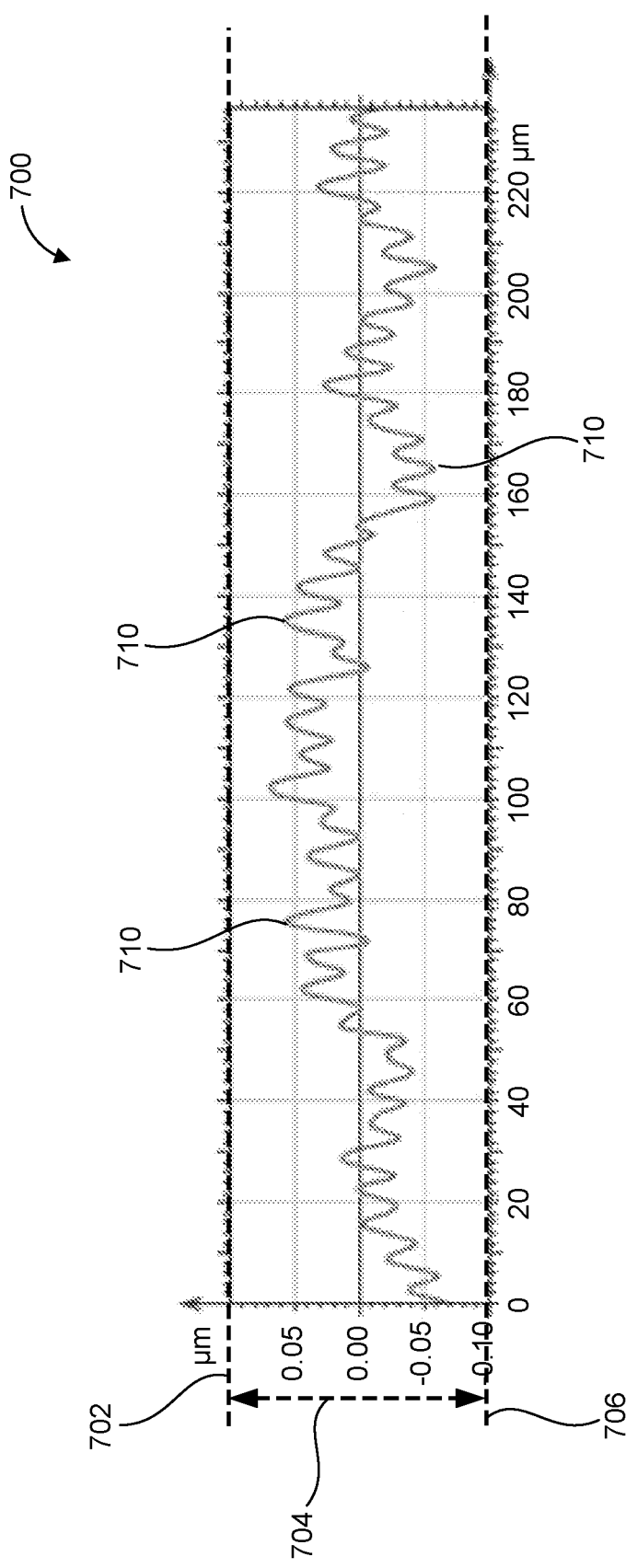
FIG. 7 is a graph for a tapered wall of a bore, according to some embodiments.

FIG. 7 illustrates a graph 700, according to some embodiments. In some embodiments, graph 700 can represent characteristics of a slice of a tapered wall of a bore along a longitudinal axis. In some embodiments, point 710 on graph 700 can be a peak about 50 nm high, or a valley about 50 nm deep along about 230 µm measurement range. In one example, a threshold can be set for graph 700, for example, threshold 702 at 100 nm and threshold 706 at −100 nm. In one example, threshold range 704 can be from −100 nm to 100 nm. In some embodiments, bores with features from peak to valley height difference larger than 200 nm may lead to process feedback or additional process as described above. For example, for bores with features above 100 nm or below −100 nm, process feedback or additional process may be performed as described above.

Exemplary Method to Measure a Tapered Wall of a Bore on a Substrate

Figure 8:
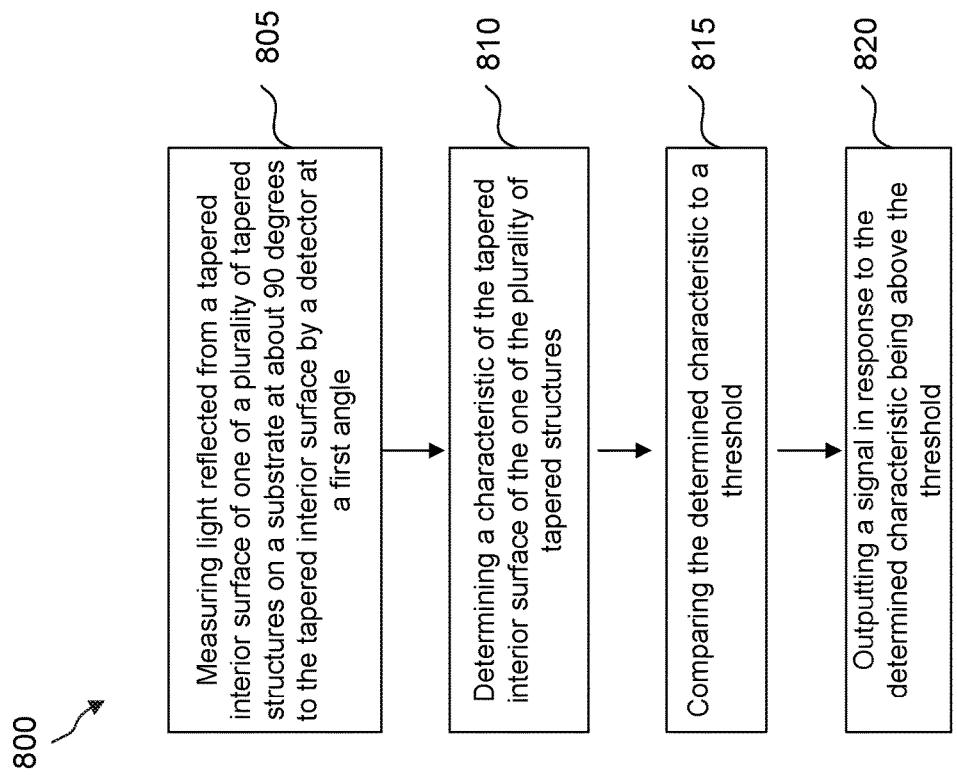
FIG. 8 is a method to measure a tapered wall of a bore on a substrate, according to some embodiments.

FIG. 8 shows a flowchart depicting a method 800 for measuring a bore on a substrate, according to some embodiments. This disclosure is not limited to this operational description. It is to be appreciated that additional operations may be performed. Moreover, not all operations may be needed to perform the disclosure provided herein. Further, some of the operations may be performed simultaneously, or in a different order than shown in FIG. 8. In some embodiments, operations of method 800 can be performed by, for example, measuring system 400, 500, 550, and 600 of FIGS. 4-6. Operations of method 800 can also be performed by other embodiments discussed in this disclosure. In some implementations, one or more other operations may be performed in addition to or in place of the presently described operations.

In some embodiments, method 800 starts with operation 805 by measuring light reflected from a tapered interior surface of one of a plurality of tapered structures on a substrate at an angle of about 90 degrees to the tapered interior surface by a detector tilted at a first angle. The substrate can be held horizontally by a measuring stage, and the first angle is set based on a second angle between the tapered interior surface and a longitudinal axis of the one of the plurality of tapered structures. For example, referring to FIG. 4, light 402 is reflected from tapered wall 310 of one of a plurality of bores 304 on substrate 320 at about 90 degrees to the tapered wall 310. Detector 428 is tilted at angle 418 to measure reflected light 402. Substrate 320 is held horizontally by measuring stage 401. Angle 418 is set based on angle 314.

In some embodiments, operation 810 determines a characteristic of the tapered interior surface of the one of the plurality of tapered structures. For example, referring to FIG. 4, a characteristic of the tapered wall 310 of one of the plurality of tapered walls is determined by measuring device 422. In some embodiments, the characteristic can include surface roughness, defects, linearity, shape, or the like. And the characteristic can be determined by measuring device 422 from the image that detector 428 obtains from tapered wall 310 based on reflected light 402.

In some embodiments, operation 815 compares a characteristic to a threshold. For example, referring to FIG. 4, measuring device 422 can do the comparison. In some embodiments, the threshold can be set by measuring device 422. For example, as show in FIG. 7, the threshold can be 100 nm for the surface roughness profile.

In some embodiments, operation 820 outputs a signal in response to the determined characteristic being above the threshold. For example, referring to FIG. 4, measuring device 428 outputs a signal if determined characteristic is above the threshold, for example, a process feedback signal, or a signal for additional processing. In another example, referring to FIG. 7, if points 710 are higher than threshold 702 of 100 nm, a signal for process feedback can be output to improve manufacturing process, for example, changing pressing pins that produces bore 304. The signal can also indicate additional processing to improve surface quality of bore 304.

It is to be understood that the phraseology or terminology herein is for the purpose of description and not of limitation, such that the terminology or phraseology of the present specification is to be interpreted by those skilled in relevant art(s) in light of the teachings herein.

The term "substrate" as used herein describes a material on which tapered structures can be produced. In some embodiments, the substrate itself may be patterned and the tapered structures produced may have a variety of patterns.

The above examples are illustrative, but not limiting, of the embodiments of this disclosure. Other suitable modifications and adaptations of the variety of conditions and parameters normally encountered in the field, and which would be apparent to those skilled in the relevant art(s), are within the spirit and scope of the disclosure.

While specific embodiments of the disclosure have been described above, it will be appreciated that the disclosure may be practiced otherwise than as described. The description is not intended to limit the disclosure.

It is to be appreciated that the Detailed Description section, and not the Summary and Abstract sections, is intended to be used to interpret the claims. The Summary and Abstract sections may set forth one or more but not all exemplary embodiments of the present disclosure as contemplated by the inventor(s), and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein.

The breadth and scope of the present disclosure should not be limited by any of the above-described exemplary embodiments, but should be defined only in accordance with the following claims and their equivalents.

What is claimed is:

1. A system, comprising:
    a stage;
    a light source;
    a detector positioned to measure light from the light source that has been reflected from a tapered wall of a substrate disposed on the stage at about 90 degrees to the tapered wall, wherein a first angle between the detector and a longitudinal axis of a tapered structure of the substrate comprising the tapered wall depends at least in part on a second angle between the tapered wall and the longitudinal axis;
    a measuring device configured to determine a characteristic of the tapered wall;
    the detector further comprises a fold mirror; and
    a third angle is formed between an axis of the detector and the fold mirror, such that the fold mirror directs the reflected light to the detector.

2. The system of claim 1, wherein the first angle is up to about 60 degrees.

3. The system of claim 1, wherein the second angle is about 30 degrees.

4. The system of claim 1, wherein
    the third angle that is formed between the axis of the detector and the fold mirror is about 45 degrees.

5. The system of claim 4, wherein the first angle is up to about 45 degrees.

6. The system of claim 1, wherein the detector has a working distance larger than about 10 mm.

7. The system of claim 1, wherein the characteristic comprises at least one of surface roughness, linearity, shape, or defects.

8. The system of claim 1, wherein the characteristic comprises features having a height of nanometer scale over a micrometer measurement range, and the measuring device determines whether the characteristic of the tapered wall is above or below a threshold.

9. The system of claim 1, wherein the substrate comprises glass.

10. The system of claim 1, wherein the tapered wall extends between first and second openings at opposite ends of the tapered structure, and the first and second openings independently have diameters ranging from about 1.5 mm to about 2.5 mm.

11. The system of claim 1, wherein the tapered structure has a height ranging from about 0.3 mm to about 1 mm.

12. The system of claim 1, wherein the stage comprises a rotation stage and a translation stage.

13. The system of claim 12, wherein the rotation stage is disposed over the translation stage or the translation stage is disposed over the rotation stage.

14. The system of claim 1, wherein:
    the tapered structure comprises a plurality of tapered structures; and
    the stage is adjustable to reposition the substrate for the detector to measure light reflected from the tapered wall of each tapered structure.

* * * * *